UNITED STATES PATENT OFFICE.

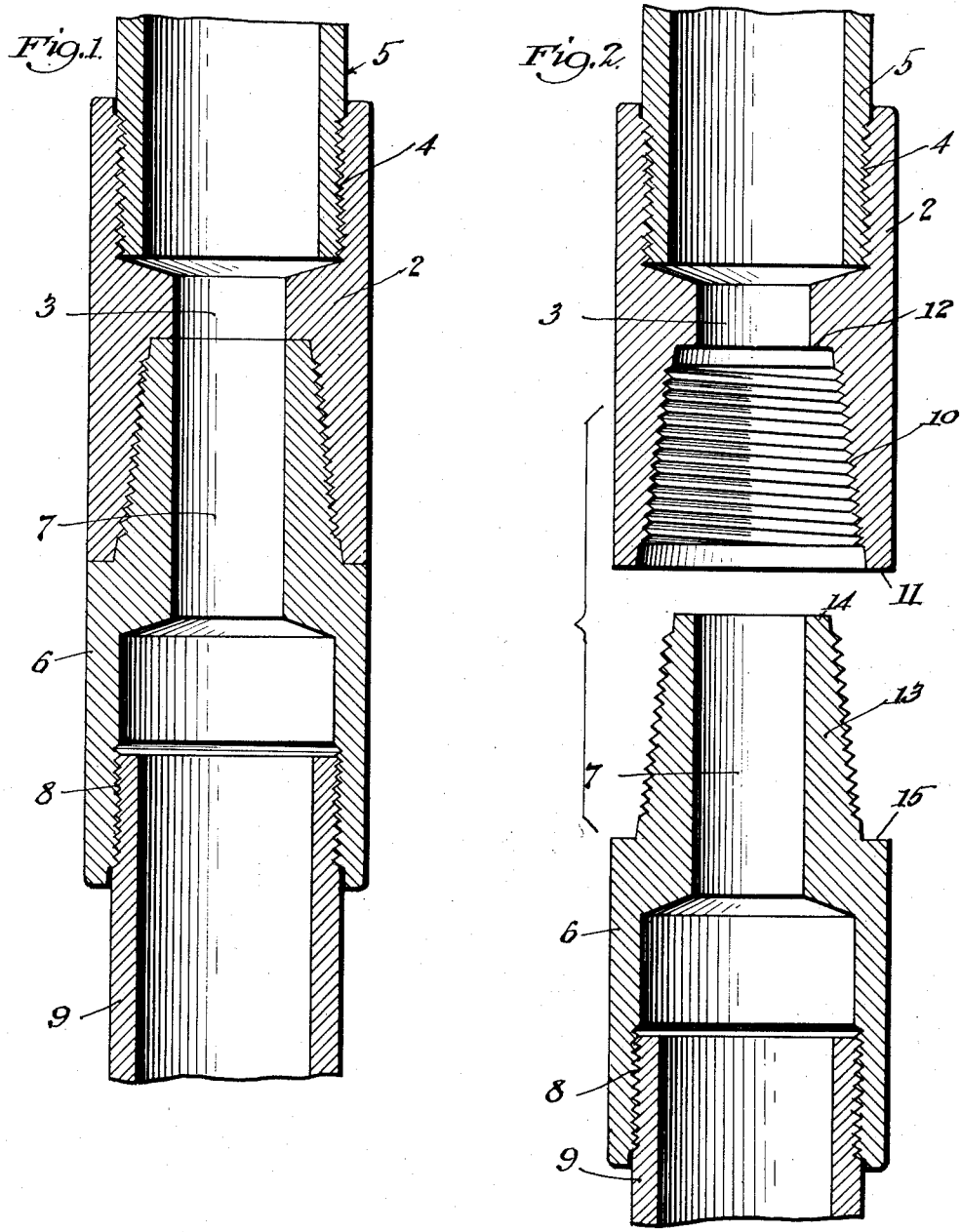

ROBERT LEE BURNS, OF TAFT, CALIFORNIA.

ROTARY COUPLING.

1,326,643.  Specification of Letters Patent.  Patented Dec. 30, 1919.

Application filed June 11, 1919. Serial No. 303,357.

*To all whom it may concern:*

Be it known that I, ROBERT LEE BURNS, a citizen of the United States, residing at Taft, in the county of Kern and State of California, have invented a new and useful Rotary Coupling, of which the following is a specification.

My invention relates to couplings adapted for use particularly with the rotary method of well boring wherein the rotary cutter is connected with the rotary driving table by means of a tube or pipe through which water is pumped to remove the borings. In use my couplings may be inserted between the sections of said tube or pipe.

An object of my invention is to provide a coupling of the character referred to which will provide a double seat between the box and pin sections thereof, thus preventing creeping of the threads and assuring that the same may be easily unscrewed.

Another object of my invention is to provide a coupling of said type having means to prevent the mud and borings passing through said pipe from entering between the threads of the coupling.

Other objects and advantages will appear in the subjoined detailed description.

The accompanying drawings illustrate the invention.

Figure 1 is an axial section of two sections of well casing connected by my coupling.

Fig. 2 is a view of the same with the box and pin unscrewed from each other.

Referring to the drawings 2 designates a box having a longitudinal bore 3 and a suitable thread 4 to receive the threaded end of a pipe section 5. A pin 6 has a longitudinal bore 7 adapted to register with the bore 3 and a suitable thread 8 to receive the threaded end of a second section 9.

The box 2 is provided with a screw-threaded taper-seat 10 which terminates at the outer end in an annular shoulder 11. An annular seat 12 extends transversely between the bore 3 and the top of the inner wall of the taper-seat 10.

The pin 6 is formed with a screw-threaded taper-pin 13 terminating at its outer end in an annular shoulder 14. An annular seat 15 extends transversely between the periphery of the pin 6 and the taper-pin 13.

The taper-seat 10 and taper-pin 13 are mutually engaging and are properly proportioned so that the annular shoulder 11 will engage the seat 15 coincident with the annular shoulder 14 engaging the seat 12.

In operation my coupling provides a double seat for the box 2 and pin 6. The torsional rotary strain in the pipe will be taken upon the annular seats 12 and 15, thus relieving the threads of the same. This will check any tendency of the taper-pin 13 to creep within the taper-seat 10, insuring against any stretching or pulling of the threads.

The seating of the annular shoulder 14 upon the seat 12 prevents mud or borings while passing through the tubing and coupling from entering between the threads of the box and pin joints.

As there is no creeping of the threads of the box and pin joint and as the threads thereof are protected from the mud and borings, the box and pin may at all times be easily and readily unscrewed.

I claim:

1. A rotary coupling comprising a box having a screw threaded taper-seat, and a pin having a screw threaded taper-pin, said box and pin each having an annular shoulder and an annular seat, said annular shoulders contacting simultaneously with said annular seats when said taper-pin is screwed within said taper-seat.

2. A rotary coupling taper-seat comprising a box having a screw-threaded taper-seat terminating in an annular shoulder, an annular seat formed at the head of said taper-seat in said box, a pin having a screw threaded taper-pin terminating in an annular shoulder, and an annular seat formed on said pin surrounding said taper-pin, said annular shoulders contacting simultaneously with said annular seats when said taper-pin is screwed within said taper-seat.

Signed at Taft, California, this 4th day of June, 1919.

ROBERT LEE BURNS.

Witnesses:
A. T. CONNARD,
RUTH MONTGOMERY.